(12) United States Patent
Jankura

(10) Patent No.: US 11,352,094 B2
(45) Date of Patent: Jun. 7, 2022

(54) STEERING LINKAGE FOR BICYCLES

(71) Applicant: Robb Henry Jankura, Boulder, CO (US)

(72) Inventor: Robb Henry Jankura, Boulder, CO (US)

(73) Assignee: CLEV Design, LTD., Boulder, CO (US)

(*) Notice: Subject to any disclaimer, the term of this patent is extended or adjusted under 35 U.S.C. 154(b) by 0 days.

(21) Appl. No.: 17/293,853

(22) PCT Filed: Nov. 23, 2020

(86) PCT No.: PCT/US2020/061812
§ 371 (c)(1),
(2) Date: May 13, 2021

(87) PCT Pub. No.: WO2021/102416
PCT Pub. Date: May 27, 2021

(65) Prior Publication Data
US 2021/0354777 A1    Nov. 18, 2021

Related U.S. Application Data

(60) Provisional application No. 62/939,381, filed on Nov. 22, 2019, provisional application No. 62/967,938, filed on Jan. 30, 2020.

(51) Int. Cl.
*B62K 21/18* (2006.01)
*B62K 19/32* (2006.01)

(52) U.S. Cl.
CPC ............. *B62K 21/18* (2013.01); *B62K 19/32* (2013.01)

(58) Field of Classification Search
CPC ........ B62K 21/18; B62K 19/32; B62K 21/00; B62K 19/30
See application file for complete search history.

(56) References Cited

U.S. PATENT DOCUMENTS

| 1,605,680 | A | * | 11/1926 | Joseph | B62K 25/16 |
| | | | | | 280/276 |
| 4,108,460 | A | * | 8/1978 | Silva, Jr. | B62K 3/005 |
| | | | | | 280/236 |
| 4,268,055 | A | * | 5/1981 | Bell | B62K 3/10 |
| | | | | | 280/278 |
| 4,540,189 | A | | 9/1985 | Tanaka | |
| 5,299,820 | A | * | 4/1994 | Lawwill | B62K 25/24 |
| | | | | | 280/277 |
| 5,429,380 | A | * | 7/1995 | Lawwill | B62K 25/24 |
| | | | | | 280/277 |

(Continued)

*Primary Examiner* — Tony H Winner
*Assistant Examiner* — Michael R Stabley
(74) *Attorney, Agent, or Firm* — Holzer Patel Drennan

(57) ABSTRACT

A steering linkage assembly that allows an offset between a steering axis and a headtube axis of a bicycle. In turn, rider cockpit dimensions are divorced from vehicle performance aspects such that vehicle performance aspects may be tailored regardless of rider size. The steering linkage assembly generally includes linkage members on an opposite side of a linkage chassis than handlebars of the bicycle to improve performance by increasing steering angle range allowed by the linkage. In addition, different linkage members and linkage chasses may be provided to accommodate different offsets between the steering axis and the headtube axis.

21 Claims, 12 Drawing Sheets

(56) References Cited

U.S. PATENT DOCUMENTS

| | | | | |
|---|---|---|---|---|
| 5,749,590 A * | 5/1998 | Roerig | ................... | B62K 25/24 |
| | | | | 280/276 |
| 5,899,478 A * | 5/1999 | Woodside | .............. | B62K 25/16 |
| | | | | 280/276 |
| 6,042,134 A | 3/2000 | Rector | | |
| 6,634,251 B2 * | 10/2003 | Chen | ..................... | B62K 21/00 |
| | | | | 280/279 |
| 7,159,883 B2 * | 1/2007 | Mydlarz | ................ | B62K 21/02 |
| | | | | 280/275 |
| 8,678,485 B2 * | 3/2014 | Keisuke | ................ | B62K 19/20 |
| | | | | 296/205 |
| 9,815,518 B2 * | 11/2017 | Zhou | ....................... | B62M 1/12 |
| 2003/0136216 A1 | 7/2003 | Chen | | |
| 2004/0041364 A1 | 3/2004 | Yen | | |

\* cited by examiner

STEERING LINKAGE FOR BICYCLES

RELATED APPLICATIONS

This application is a § 371 national phase filing of PCT/US20/61812 entitled "STEERING LINKAGE FOR BICYCLES" filed on 23 Nov. 2020, which is related to and claims benefit of priority to U.S. Provisional Patent App. No. 62/939,381, entitled "STEERING LINKAGE FOR BICYCLES" filed on 22 Nov. 2019 and U.S. Provisional Patent App. No. 62/967,938, entitled "STEERING LINKAGE FOR BICYCLES" filed on 30 Jan. 2020, the entire disclosures of each of the foregoing is incorporated herein by reference.

BACKGROUND

As the sport of mountain biking has matured, many independent disciplines have formed within the sport. Each of these disciplines demands different performance attributes from the bike and rider. For example, the discipline of Cross Country racing demands nimble, light and stiff bikes—and aerobically fit riders with powerful legs. In contrast, the discipline of Downhill requires vehicle stability at high speed, maximum tire traction, and extensive suspension for both wheels and full body strong riders. The bikes for these specific disciplines have developed in such a divergent manner that they can barely be recognized as relatives. Specifically, bicycles designed for each respective discipline have vastly different geometries that tailor each type of bicycle to the specific discipline. Yet there remain some fundamental architecture commonalities between these very different mountain bikes.

All mountain bikes are offered in several sizes to fit riders of different heights. The parameters that define rider fit are collectively called the rider cockpit. The rider cockpit is made up of 3 primary contact points, 1) the rider's foot to pedal, 2) the rider's posterior to saddle, 3) the rider's hand to handlebar. The distance between these contact points depends on the size of rider. A taller rider will require a larger effective "rider cockpit" (longer distances between contact points) than a shorter rider. FIG. 1 depicts common measurements of bicycles. Two primary measurements of the rider cockpit include "stack" and "reach." Stack refers to the vertical distance measured from the bottom bracket of the bicycle to a horizontal datum aligned with the top of the bicycle's head tube. Reach refers to a horizontal distance from the top of the bicycle's headtube to a vertical datum aligned with the bicycle's bottom bracket. Seat height on a bicycle is often adjustable through a seat post that may telescopically engage a seat tube of the bicycle. In addition, the placement of the handlebars may be adjusted through use of spacers, different sized stems, or the like. However, the stack and reach are fixed values for a given bicycle frame, as are the seat tube angle and head tube angle (which effects the "rake" of the fork of the bicycle). Bicycles are currently built around the rider cockpit, defined by the stack and reach described above.

The rider cockpit dimensions define many other performance attributes of the bike. For example, wheelbase is the distance between the front and rear wheel. The wheelbase may affect a bicycle's performance attributes. For example, a shorter wheelbase results in a more maneuverable, but less stable bike. Conversely, a longer wheelbase results in a more cumbersome (e.g., less maneuverable), but more stable bike. Due to the bicycle architecture (front wheel connected to fork, connected to headtube, connected to stem, connected to handlebar), wheelbase is directly proportional to rider cockpit. So, a bike designed to fit a shorter rider will have a proportionally shorter wheelbase, and a bike designed to fit a taller rider will have a proportionally longer wheelbase. This means the vehicle performance attributes are directly tied to the size of rider. A shorter rider has no choice but to ride a bike that is more maneuverable, but less stable. And a taller rider has no choice but to ride a more cumbersome, but more stable bike. Accordingly, the current paradigm governing bicycle design ties certain bicycle geometries that affect the vehicle performance with the rider cockpit dimensions such that vehicle performance characteristics are directly tied to the size of the bicycle required to fit a given sized rider.

SUMMARY

In view of the foregoing, the present disclosure relates to a steering linkage for a bicycle. By use of a steering linkage as described herein, the rider cockpit sizing is effectively divorced from the overall bicycle performance geometry parameters such that the dependence on rider size as a factor for bicycle performance characteristic is reduced or eliminated. That is, by use of the steering linkage described herein, rider cockpit dimensions (e.g., reach and stack) may be established to fit a rider while not effecting the geometry of the bicycle that affect vehicle performance such as wheelbase, fork rake, and the like. That is, the purpose of the steering linkage is to disassociate the "rider cockpit" from "vehicle performance attributes." For example, a bike using the steering linkage described herein can have a "rider cockpit" to fit a taller rider but have a shorter wheelbase to provide a more dynamic vehicle performance attribute. Conversely, the presently described steering linkage may allow a shorter rider to fit a longer wheelbase bicycle to provide a more stable vehicle performance attribute. In short, the rider can now decide what kind of vehicle performance attributes the rider wants, independent of rider cockpit fit.

Accordingly, the present disclosure generally relates to a steering linkage assembly. The steering linkage assembly includes a linkage chassis, a fork steerer, a handlebar steerer, and one or more linkage member. The linkage chassis includes a steering tube having a steering axis that is offset from a headtube axis defined by a headtube of a bicycle frame. The linkage chassis may be integrated with a bicycle frame or may comprise a separate component that may be affixed to the bicycle frame (e.g., at the headtube).

In any regard, the fork steerer is configured for co-rotation with a fork of the bicycle frame and the handlebar steerer is configured for co-rotation with handlebars. Additionally, the linkage member extends between the fork steerer and the handlebar steerer to impart co-rotational movement between the handlebar steerer and the fork steerer. The linkage member is disposed on a side of the linkage chassis opposite the handlebars for uninterrupted movement of the linkage member by the bicycle frame or the linkage chassis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 8:
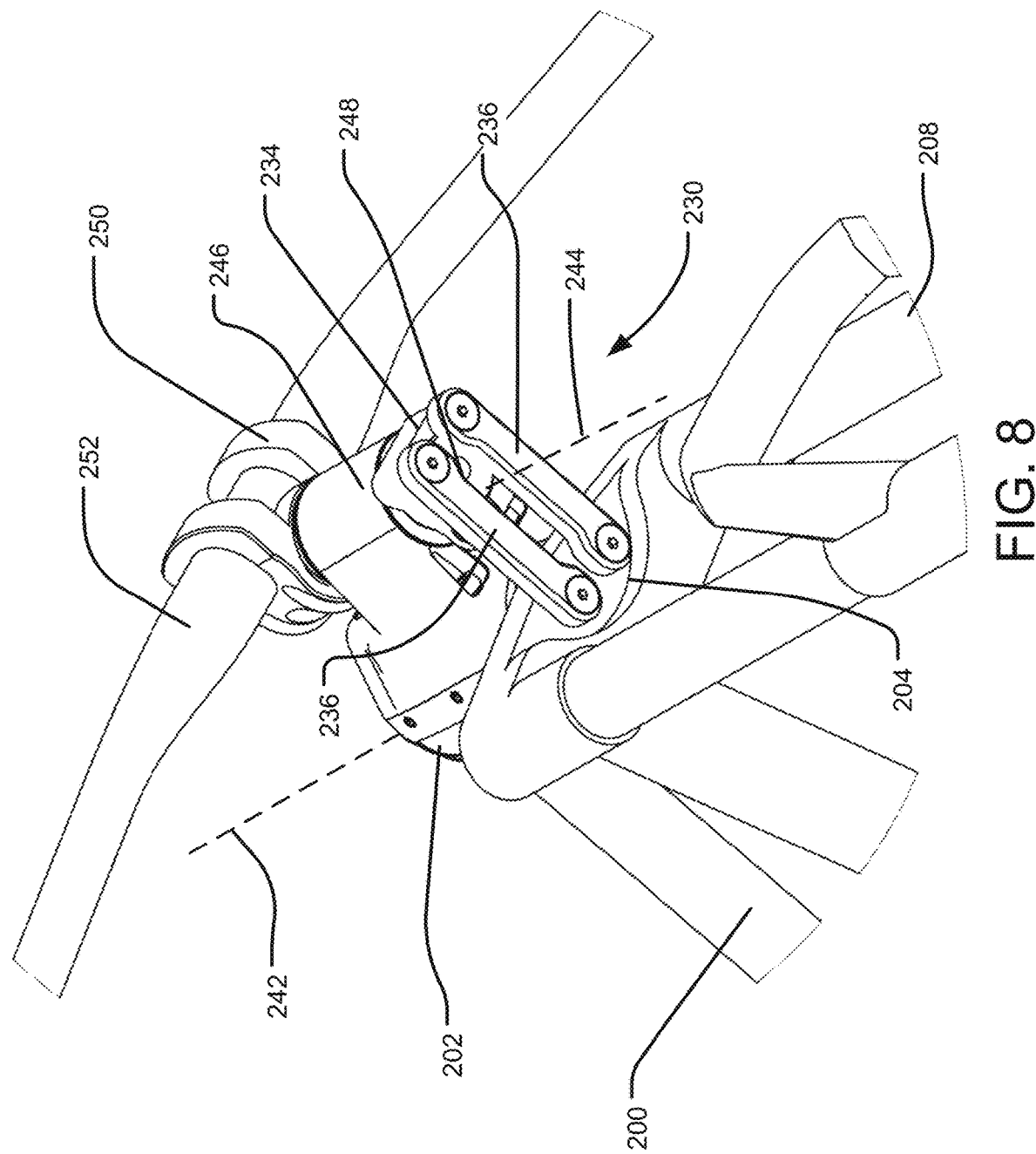

FIG. 8 a detailed bottom-front perspective view of another example of a bicycle having a steering linkage assembly with the handlebars in a "neutral" or straight arrangement.

Figure 9:
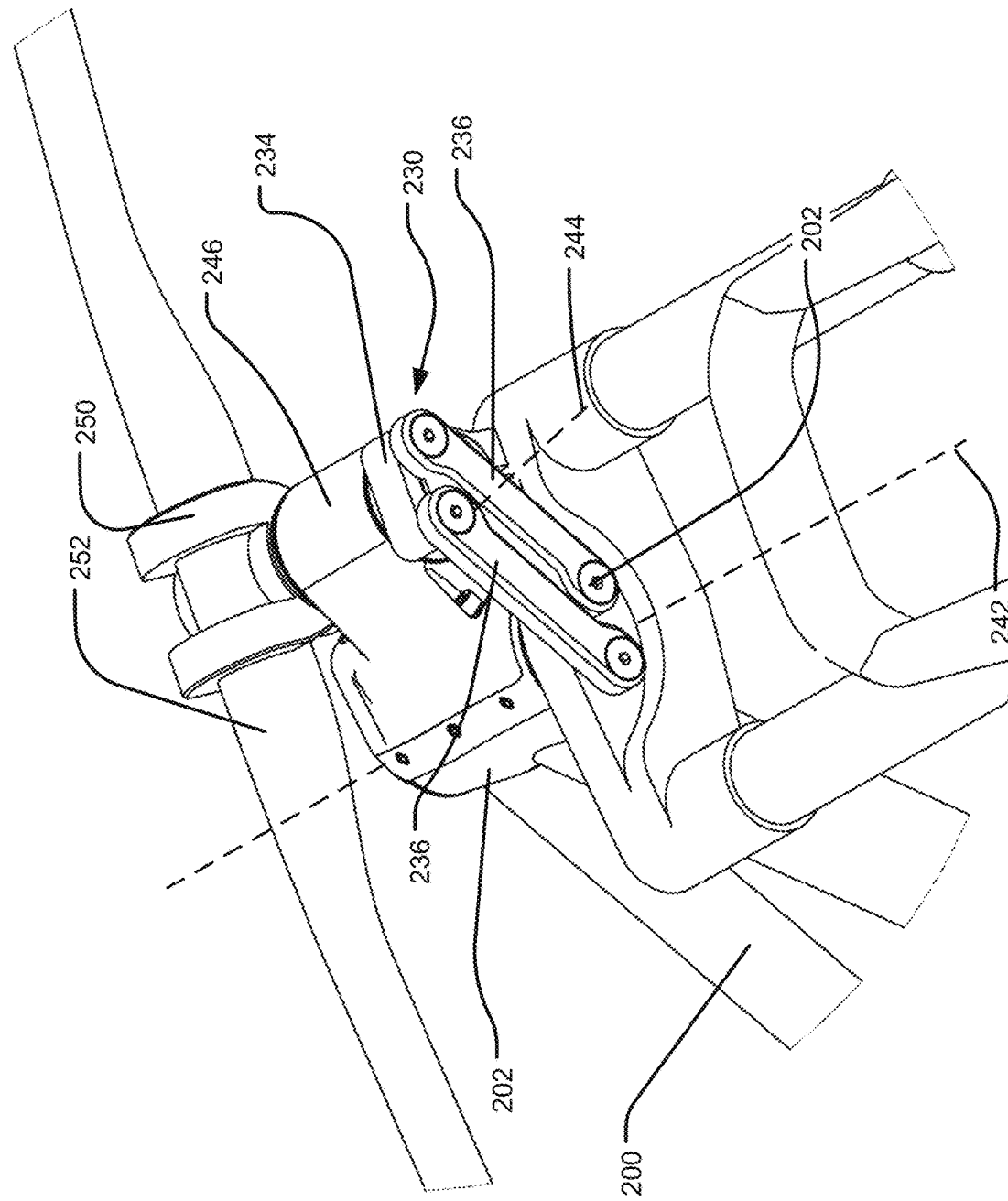

FIG. 9 a detailed bottom-front perspective view of another example of a bicycle having a steering linkage assembly with the handlebars in a turned arrangement.

Figure 10:
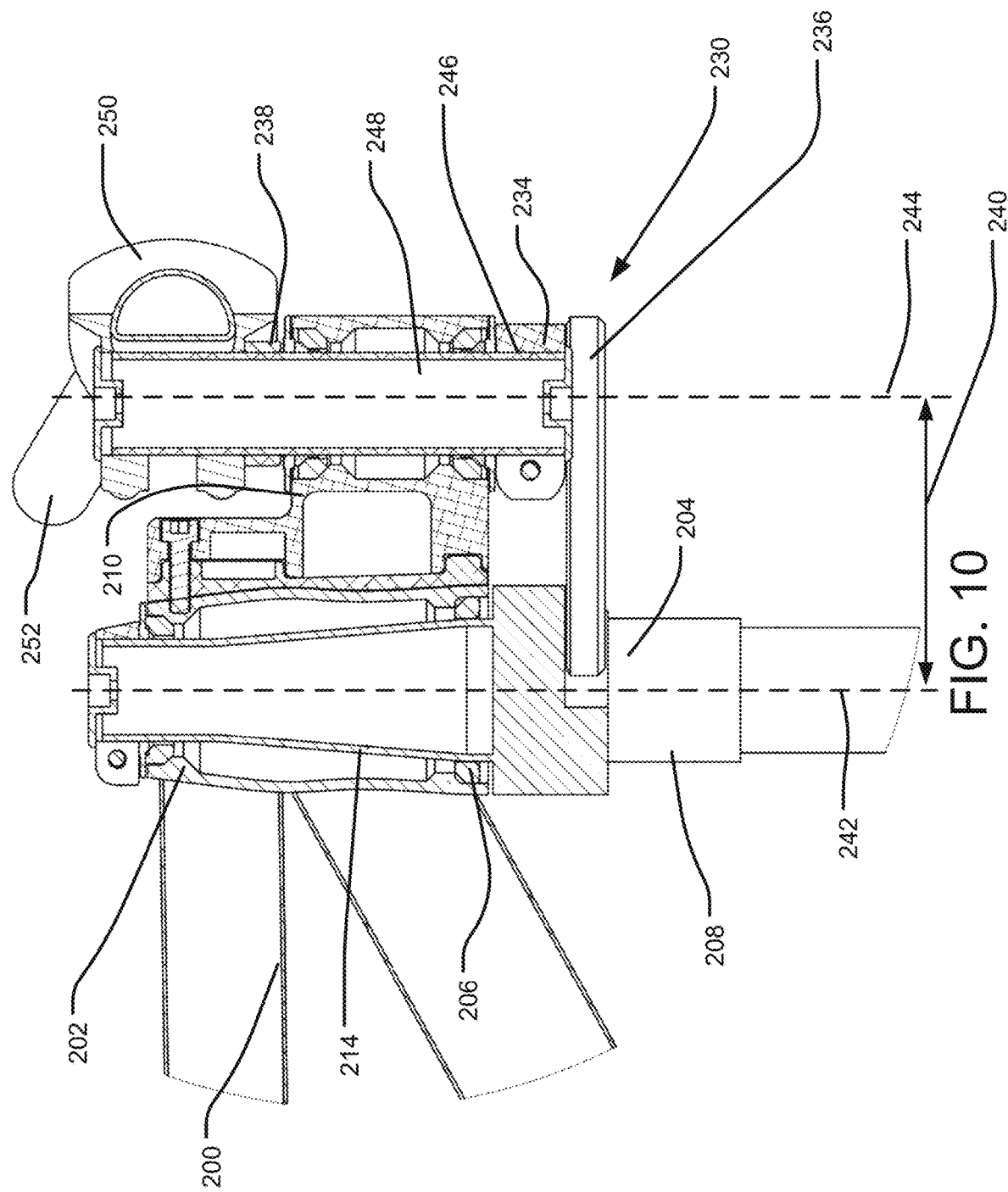

FIG. 10 depicts a cross-sectional view of another example of a steering linkage assembly taken along a centerline of the bicycle frame.

Figure 11:
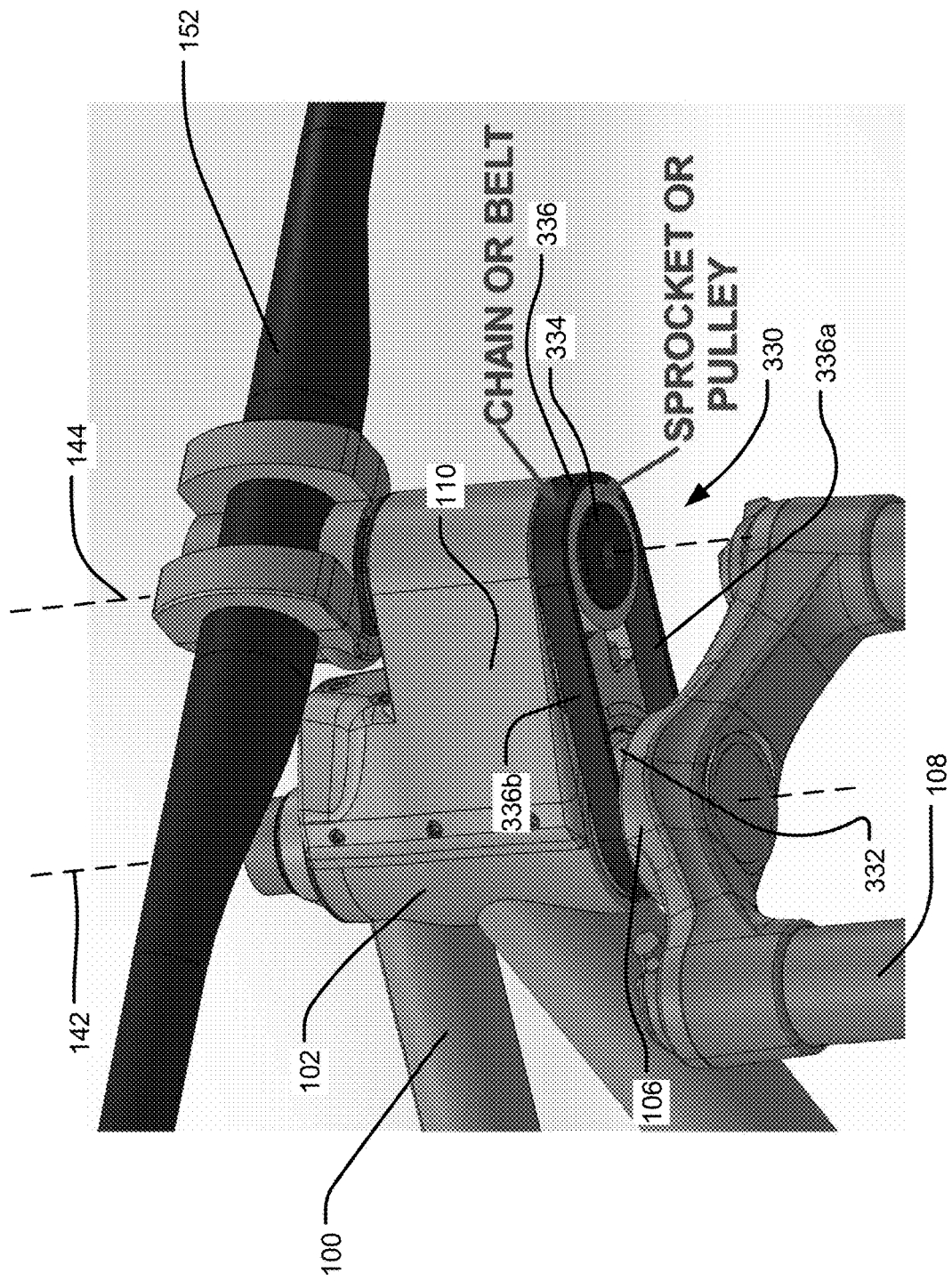

FIG. 11 depicts an example of a steering linkage assembly having a flexible linkage connecting the handlebar steerer and the fork steerer.

Figure 12:
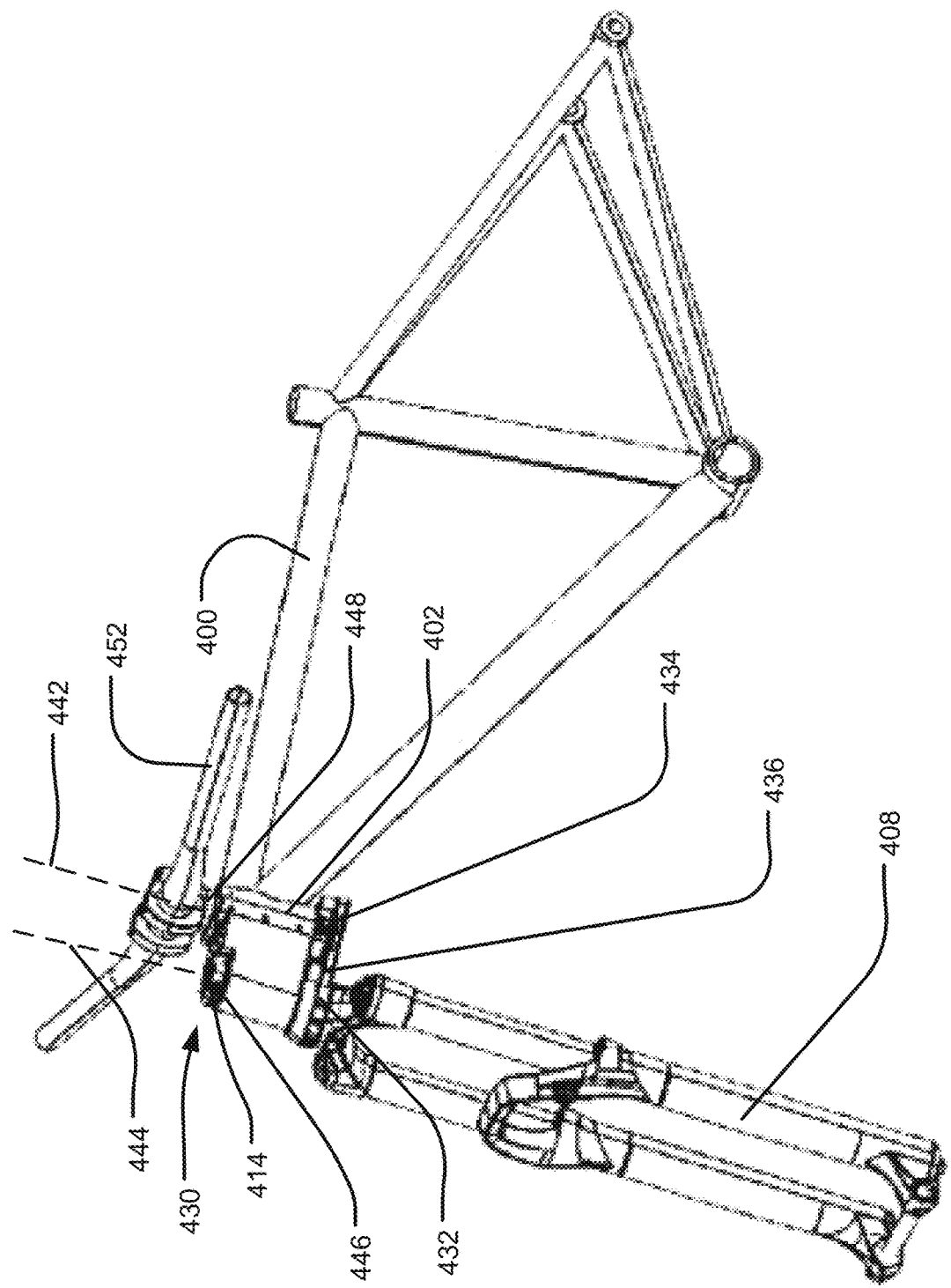

FIG. 12 depicts an example of a steering linkage assembly in which the handlebar steerer is disposed in a headtube of a bicycle and the fork steerer is disposed in a steering tube of the linkage chassis.

DETAILED DESCRIPTIONS

As described above, the present disclosure generally relates to a steering linkage for a bicycle that allows certain rider cockpit dimensions and vehicle performance attributes to be independently controlled.

Figure 1:
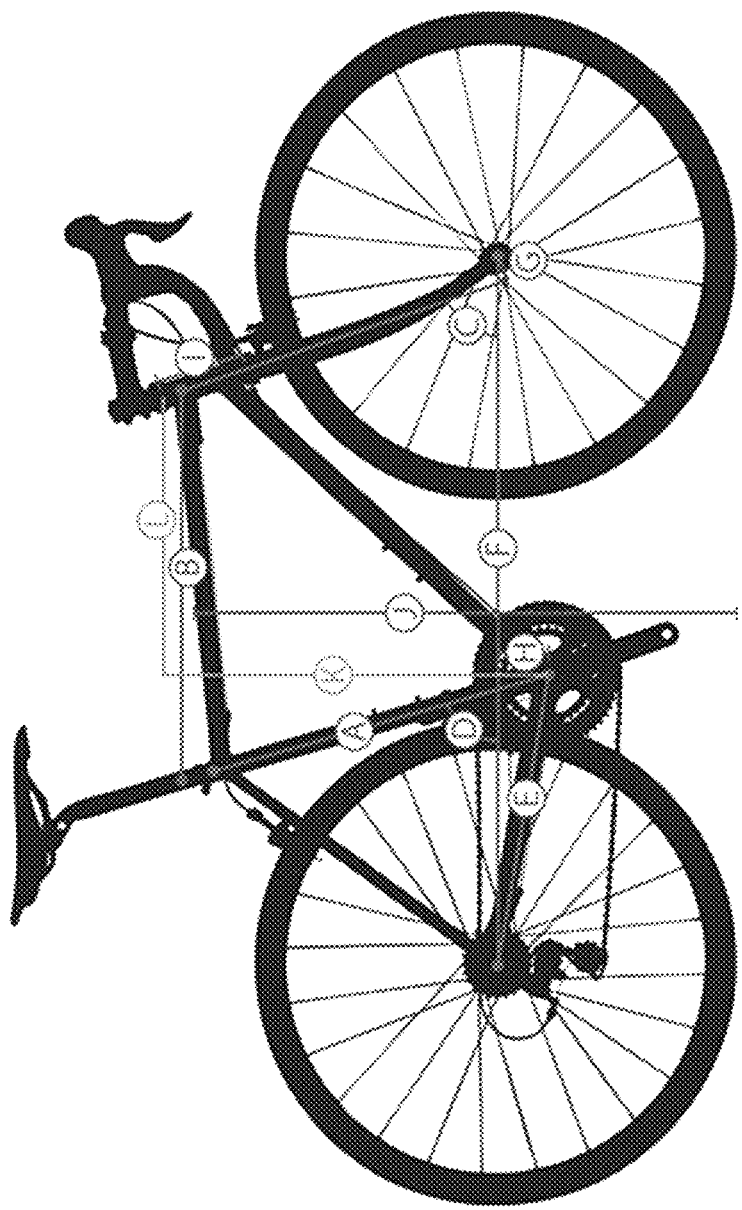
FIG. 1 depicts example bicycle measures and components.
Figure 2:
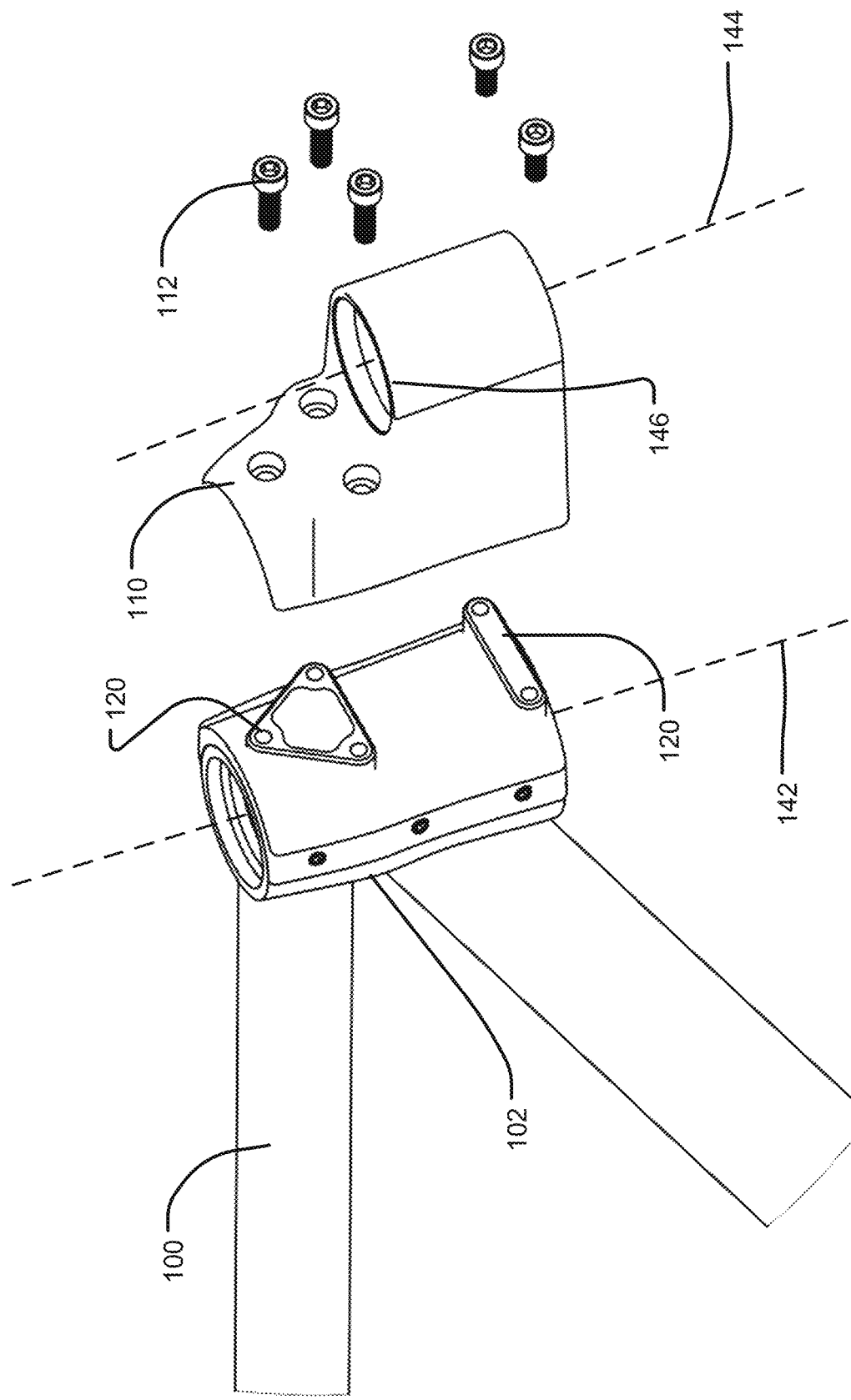
FIG. 2 depicts an example of a linkage chassis in an exploded position relative to a bicycle frame.
Figure 3:
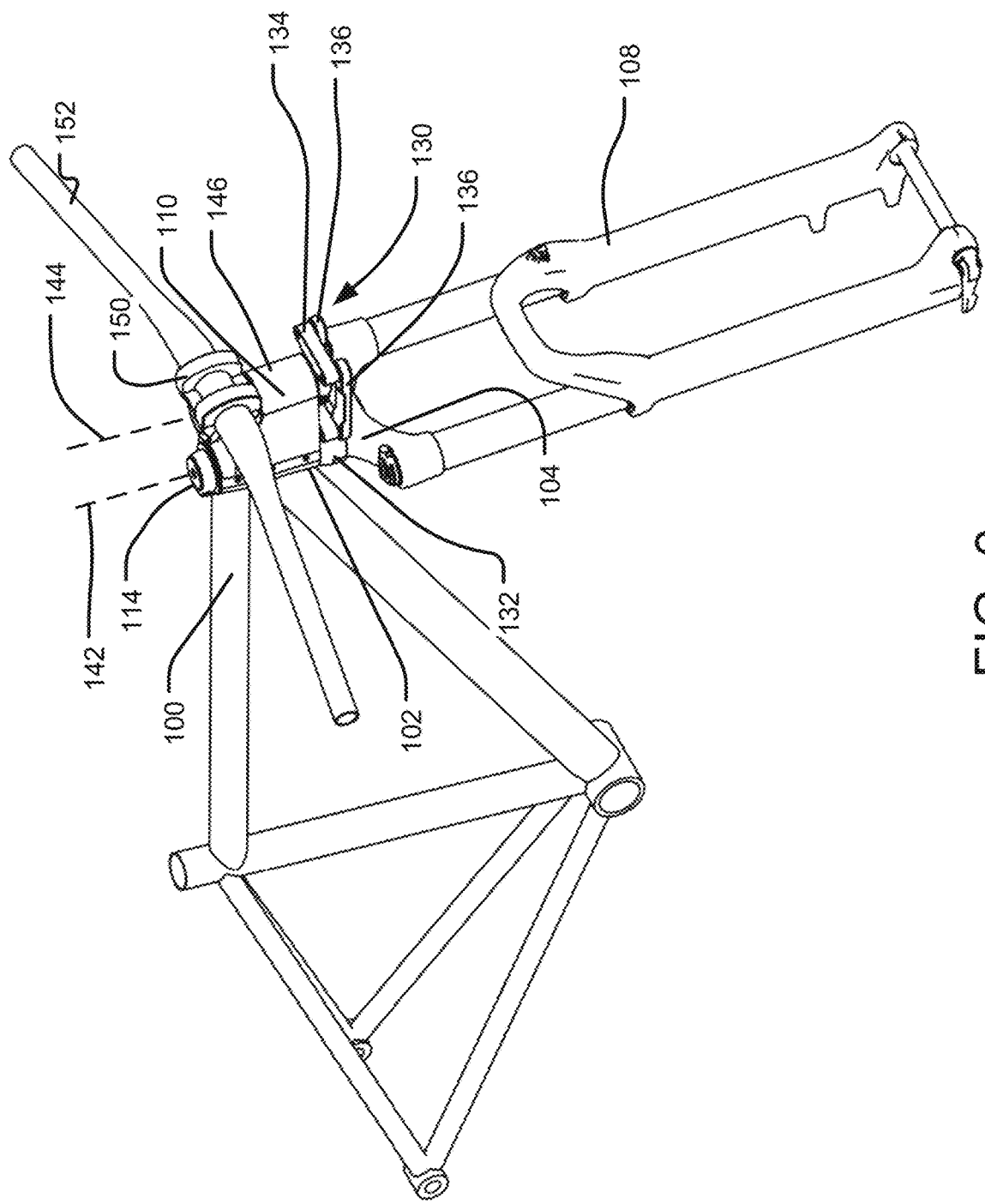
FIG. 3 depicts a perspective view of an example of a bicycle having a steering linkage assembly with the handlebars in a "neutral" or straight arrangement.
Figure 4:
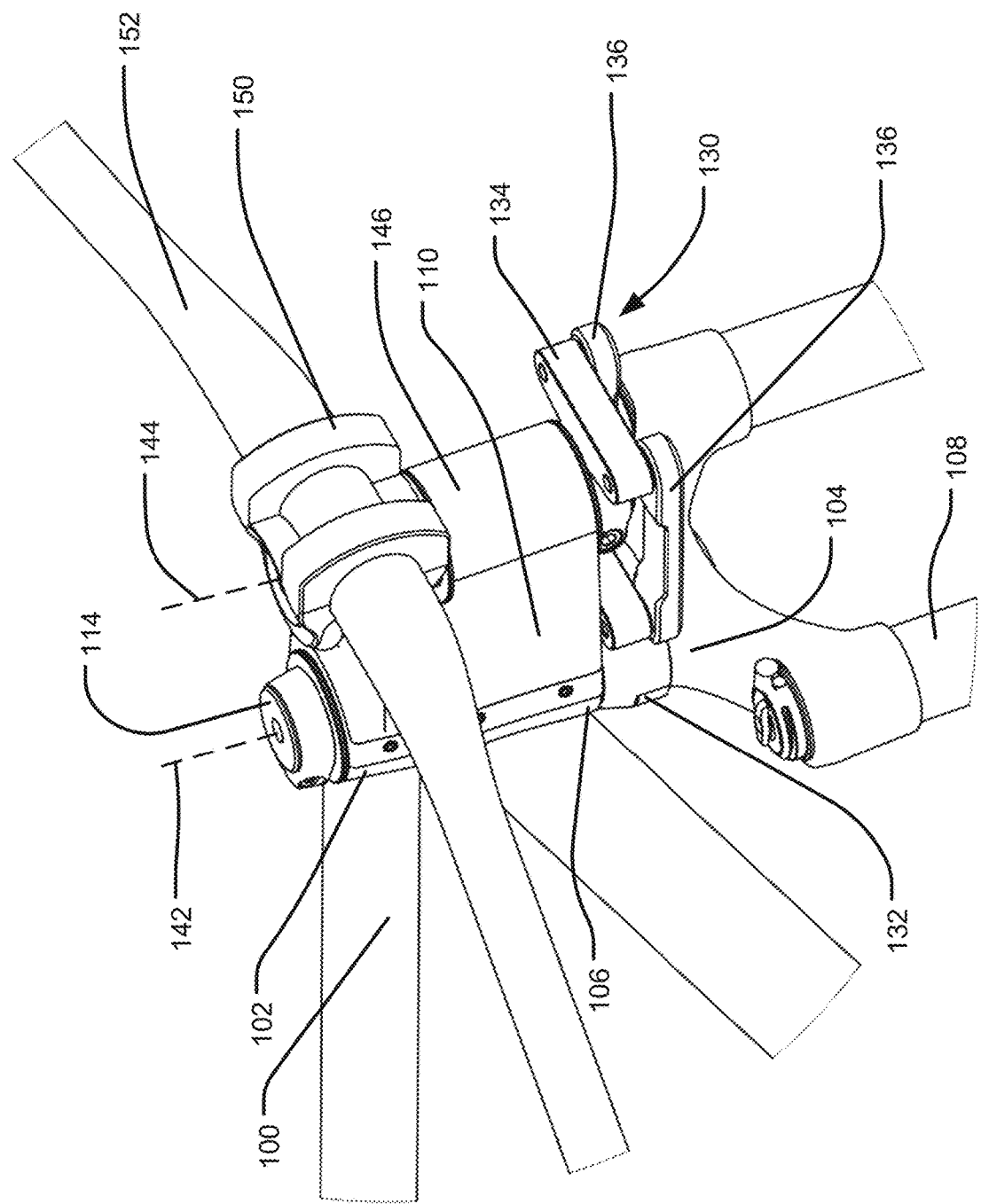
FIG. 4 depicts a detailed top-front perspective view of an example of a bicycle having a steering linkage assembly with the handlebars in a "neutral" or straight arrangement.
Figure 5:
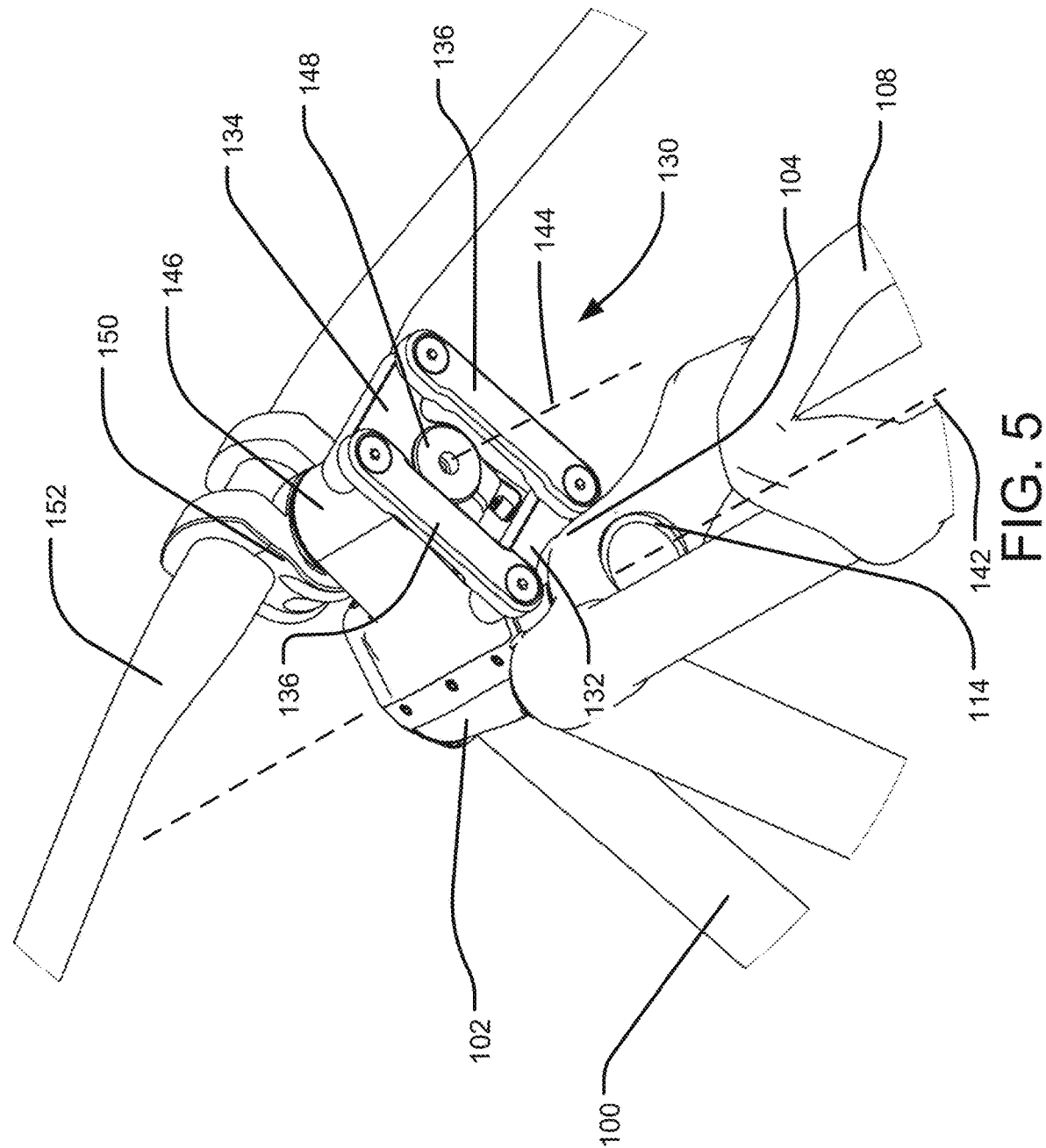
FIG. 5 depicts a detailed bottom-front perspective view of an example of a bicycle having a steering linkage assembly with the handlebars in a "neutral" or straight arrangement.
Figure 6:
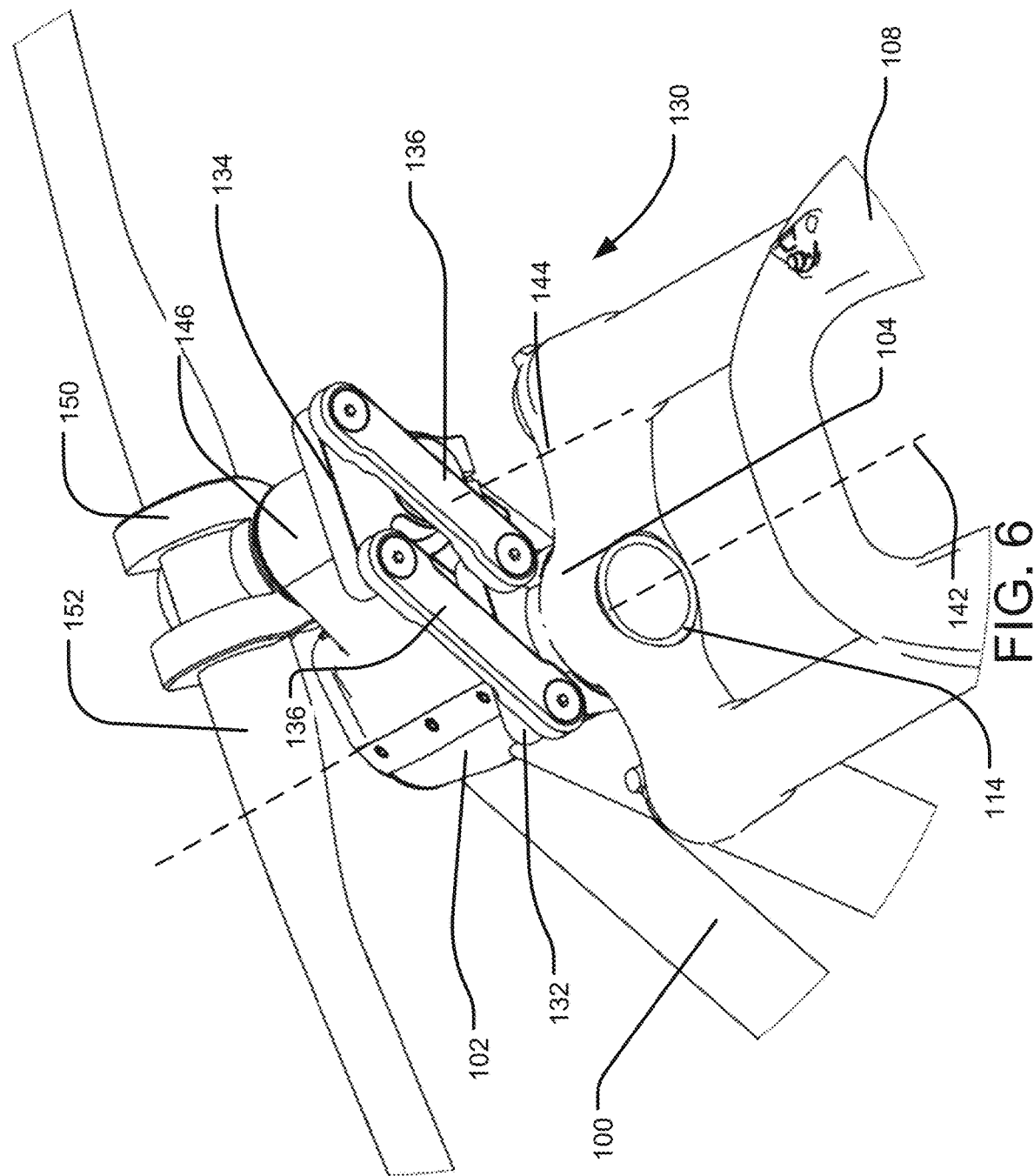
FIG. 6 depicts a detailed bottom-front perspective view of an example of a bicycle having a steering linkage assembly with the handlebars in a turned arrangement.
Figure 7:
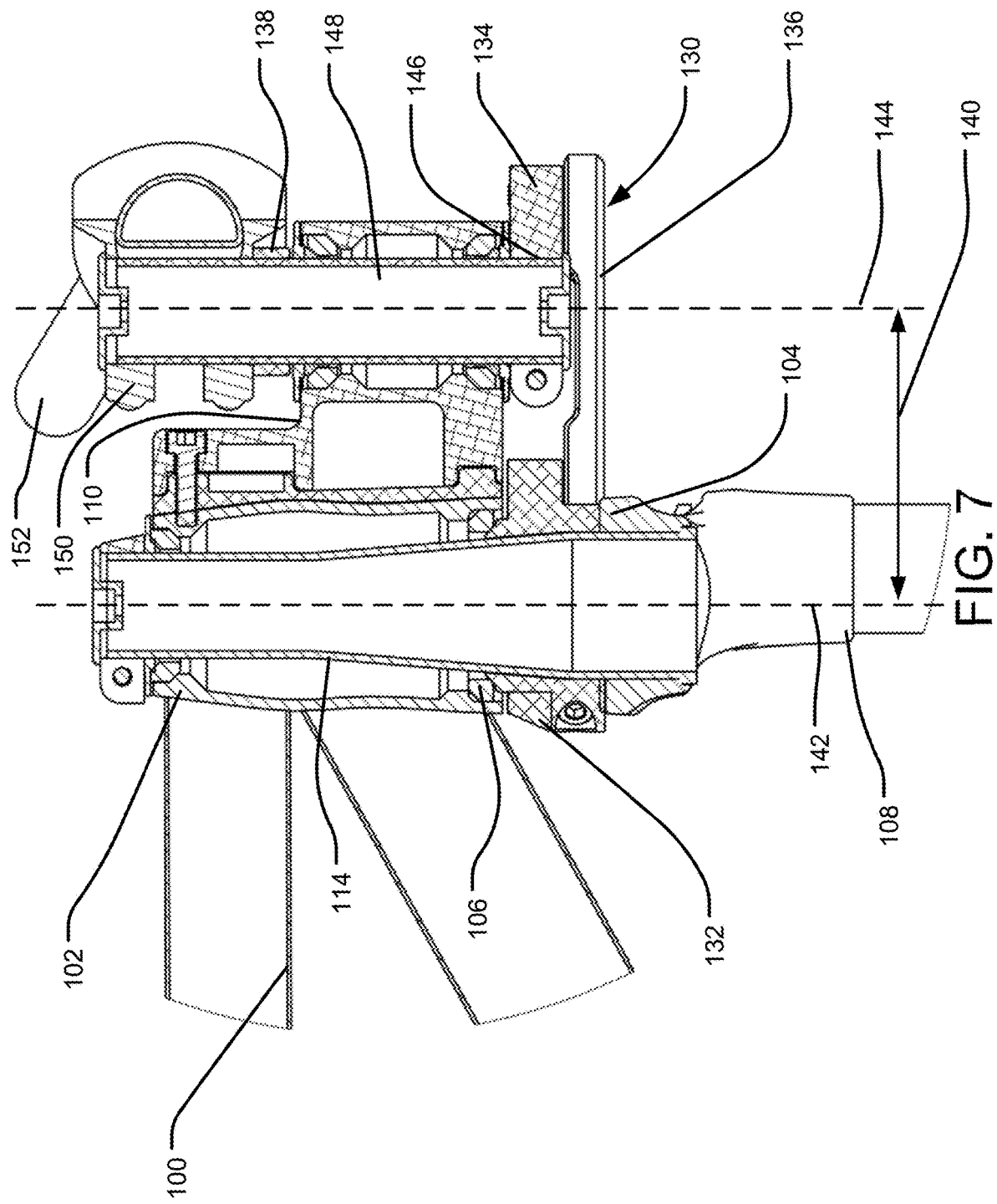
FIG. 7 depicts a cross-sectional view of an example of a steering linkage assembly taken along a centerline of the bicycle frame.

FIG. 2 illustrates an exploded view of an example of a linkage chassis 110 that may be secured to a bicycle frame 100. The linkage chassis 110 may securely attach to mating features 120 located on the front of the headtube 102. For instance, the mating features 120 may include threaded holes for receipt of fasteners 112. In turn, the linkage chassis 110 may be attached and removed using common tools. This allows the user to swap out different length linkage assemblies in order to fine tune the dimensions of the rider cockpit (e.g., reach and/or stack) independently of the vehicle performance attributes such as bicycle wheelbase, which may remain unaffected as the headtube 102 remains unchanged. As will be described in greater detail below, this may allow a kit to be provided to allow for a modification of an offset length between a headtube axis 142 of the bicycle frame 100 and a steering axis 144 of the linkage chassis 110 defined by a steering tube 146 of the linkage chassis 110.

Additionally, the user can opt to remove the linkage chassis 110 and any associated steering linkage assembly at all, instead setting the bike up with a traditional fork/handlebar orientation. This convenient range of size options effectively isolates the rider cockpit from the vehicle size, allowing any size rider to fit onto any size/length bike. Different kinds of riding demand different kind/size bikes.

In an alternative example, the linkage chassis 110 may be integrated with the bicycle frame 100. Therefore, in the following discussion, the attributes of the linkage chassis 110 may generally be provided regardless of whether the linkage chassis 110 is provided as separate, attachable component to the bicycle frame 100 or integrated with a bicycle frame 100. Specifically, with reference to FIGS. 3-12, the linkage chassis 110 is shown with respect to the bicycle frame 100. It may be appreciated that the linkage chassis 110 may be arranged as shown in FIGS. 3-12 whether integral or separate from the frame 100. In any regard, with use of the linkage chassis 110, a headtube 102 and a steering tube 146 may be provided that are offset by an offset length as described herein. Thus, while an attachable/detachable linkage chassis 110 is shown and described herein, the present disclosure is not so limited and may include such an integrated configuration without limitation.

With returned reference to FIGS. 3-12, examples of a steering linkage assembly 130 is shown. The steering linkage assembly 130 includes the linkage chassis 110 including the steering tube 146. The steering linkage assembly 130 includes a fork steerer 132 and a handlebar steerer 134 connected by way of one or more linkage member such as linkage bars 136. The fork steerer 132 is configured for co-rotation with a fork 108 of the bicycle frame 100. The fork steerer 132 may be clampingly engaged to a fork tube 114 that extends through the headtube 102 along the headtube axis 142. The fork tube 114 may move relative to the headtube 102 by way of rotational bearings disposed between the headtube 102 and the fork tube 114. In any regard, the fork steerer 132 may co-rotational with the fork 108 (e.g., by way of the clamping engagement with the fork tube 114).

The handlebar steerer 134 may be engaged with a steering spindle 148 that may extend through the steering tube 146 of the linkage chassis 110. The steering spindle 148 may be rotatable relative to the steering tube 146 by way of rotational bearings. The handlebar steerer 134 may be co-rotational with the steering spindle 148. For example, the handlebar steerer 134 may be clampingly engaged with, integral with, or otherwise configured for co-rotation with the steering spindle 148. The steering spindle 148 may be affixed with a stem 150 that, in turn, engages handlebars 152. In turn, rotation of the handlebars 152 results in co-rotation of the steering spindle 148 and the handlebar steerer 134.

The handlebar steerer 134 and the fork steerer 132 may be connected by way of a plurality of linkage members to effectuate co-rotation of the fork steerer 132 and the handlebar steerer 134. In the depicted example, the linkage members comprise rigid linkage bars 136 extending between the fork steerer 132 and the handlebar steerer 134. The linkage bars 136 may each be rotationally engaged at a first end thereof with the fork steerer 132 and at a second end thereof with the handlebar steerer 134. In turn, the fork steerer 132, handlebar steerer 134, and the linkage bars 136 define a linkage (e.g., a four bar linkage). The linkage results in co-rotation of the fork steerer 132 and the handlebar steerer 134. In turn, when a rider turns the handlebars 152, rotation is transmitted to the handlebar steerer 134, to the fork steerer 132, and on to the fork 108 to turn the bicycle's wheel (not shown).

The linkage defined by the fork steerer 132, handlebar steerer 134, and the linkage bars 136 is located on the underside of the main frame headtube 102 (i.e., a side adjacent to the fork 108 or nearest the ground when the bicycle frame 100 is supported by wheels). Stated differently, the linkage bars 136 may be located on a side of the linkage chassis 110 opposite that which the handlebars 152 are attached to the steering spindle 148. The fork steerer 132 of the steering linkage assembly 130 may be provided between a fork crown 104 and a lower bearing race 106 of the headtube 102. The handlebar steerer 134 may be located below the linkage chassis 110. This orientation may provide advantages over other layouts in that it allows a greater overall range of rotational motion. As the assembly rotates each linkage bar 136 can sweep underneath the handlebar steerer 134 and the linkage chassis 110. In contrast, if the linkage assembly was located on top or somewhere mid elevation, the steering range of rotational motion would be significantly reduced due to contact between one or more of the linkage bars 136 and the handlebar steerer 134.

Additionally or alternatively, the steering linkage assembly 130 may be configured such that the linkage bars 136 sweep underneath the fork steerer 132. Again, this arrangement allows for improved steering angle by precluding interference between the linkage bars 136 and the fork steerer 132. Further still, and as will be described in greater detail below integration of the fork steerer 132 into fork crown 104 may also be provided to increase steering angle range.

Use of the steering linkage assembly 130 may allow rider handlebar height to be adjusted with a number of components (e.g., including stem length and angle, steerer spacer stack 138 height (best seen in FIG. 7), and handlebar rise and sweep). While all these adjustments may be provided in traditional bicycle geometries relative to the top of the headtube 102 on a traditional bike, adjustment of this base position is limited by the structural limitations of the frame and fork. That is, all adjustments of the handlebars 152 are still limited by the fact the handlebars 152 must be provided above the top portion of the headtube 102. In this regard, the handlebar height adjustment when using the steering linkage assembly 130 may be configured in relation to the offset distance 140 of the linkage chassis 110 between the headtube axis 142 and the steering axis 144 of the steering linkage assembly 130. In addition, the steering linkage assembly 130 architecture allows more freedom to adjust handlebar height because the base position for mounting the handlebars can be located significantly lower than the top of the frame's headtube 102. That is, the steering tube 146 may terminate in a manner that is offset from the termination of the headtube 102. This may allow the components mounting the handlebars 152 to be provided at a distance offset in a direction toward the ground when the bicycle is upright on the wheels of the bicycle. This may allow for more flexibility when adjusting the rider cockpit by allowing the handlebars 152 to be mounted relatively lower than can be accomplished when mounting the handlebars 152 relative to the headtube 102.

Further still, the fork steerer 132 and the handlebar steerer 134 may also be configured to provide leveraged actuation upon co-rotation of the fork steerer 132 and the handlebar steerer 134. For instance, the fork steerer 132 and the handlebar steerer 134 may be different lengths or arranged relative to one another such that the amount of given rotation between the fork steerer 132 and the handlebar steerer 134 is not equal as the fork steerer 132 and the handlebar steerer 134 undergo co-rotation. That is, co-rotation does not require an identical amount of rotation of the fork steerer 132 and the handlebar steerer 134. Rather, while co-rotation may include equal amounts of rotation of the fork steerer 132 and the handlebar steerer 134, steering input may alternatively be amplified or dampened relative to actual movement of the fork 108. That is, for a given amount of rotation of the handlebar steerer 134 a different amount of rotation (e.g., more or less) of the fork steerer 134 and the fork 108 may be provided. For instance, steering may be made more responsive such that for a given amount of rotation of the handlebar steerer 134 results in a greater amount of rotation of the fork steerer 134 and the fork 108. Alternatively, steering may be dampened such that for a given amount of rotation of the handlebar steerer 134 results in a smaller amount of rotation of the fork steerer 134 and the fork 108. As described above, this may be achieved through different lengths of the fork steerer 132 and the handlebar steerer 134 between the linkage bars 136. Alternatively, in embodiments described below that utilize a continuous, flexible linkage member, the fork steerer 132 and the handlebar steerer 134 may have different diameters to achieve different amounts of rotation between the fork steerer 132 and the handlebar steerer 134.

In the example depicted, two independent linkage bars 136 are utilized in this architecture. This redundancy is a key safety benefit, if failure occurs in one link, there is a second to maintain a functional connection.

With further reference to FIGS. 8-10, another example of a steering linkage assembly 230. The example depicted in FIGS. 8-10 may generally include each feature recited above in relation to FIGS. 2-7. In this regard, while reference numerals for the example shown in FIGS. 2-7 were in the form 1XX, corresponding components are labeled as 2XX in the example shown in FIGS. 8-10.

In addition, the example shown in FIGS. 8-10 generally includes an integrated fork steerer such that the link bars 236 directly engage the fork 208 (e.g., at a fork crown 204). In this regard, the fork 208 may be directly acted on by the link bars 236 to co-rotate the fork 208 upon rotation of the handlebars 252 by a rider. This may provide an increased turning angle range.

FIG. 11 depicts another example of a steering linkage assembly 330. The steering linkage assembly 330 may include features as generally described above in relation to the examples of the steering linkage assembly 130 and the steering linkage assembly 230. In contrast to the foregoing steering linkage assembly examples that utilize a fork steerer and handlebar steerer connected by linkage members comprising rigid linkage bars, the steering linkage assembly 330 may include a linkage member comprising a flexible linkage member 336. The flexible linkage member 336 may comprise a continuous body such that the flexible linkage member 336 may comprise a chain, belt, or other flexible member. The flexible linkage member 336 may extend about a fork steerer 332 and a handlebar steerer 334 such that the fork steerer 332 and the handlebar steerer 334 are engaged for co-rotation.

The fork steerer 332 and/or handlebar steerer 334 may include engagement features that correspond to the flexible linkage member 336 to facilitate engagement between the flexible linkage member 336 and the fork steerer 332 and/or handlebar steerer 334. For instance, the fork steerer 332 and/or handlebar steerer 334 may include teeth, splines, or other features. In this regard, the fork steerer 332 and/or handlebar steerer 334 may comprise a gear, sprocket, splined shaft, or the like. The flexible linkage member 336 may have corresponding engagement features such as teeth, ridges, or other features that engage the fork steerer 332 and/or handlebar steerer 334.

While not shown in FIG. 11, the flexible linkage member 336 may be appropriately tensioned to maintain engagement with the fork steerer 332 and handlebar steerer 334 to effectuate co-rotation thereof. For instance, a first section 336*a* of the flexible linkage member 336 may extend between the fork steerer 332 and handlebar steerer 334 on a first side thereof and a second section 336*b* of the flexible linkage member 336 may extend between the fork steerer 332 and handlebar steerer 334 thereof. In this regard, the first section 336*a* and the second section 336*b* may comprise linkage members extending between the fork steerer 332 and handlebar steerer 334 to effectuate co-rotation thereof.

Also, while the fork steerer 332, handlebar steerer 334, and flexible linkage member 336 are shown as being disposed entirely beyond the profile of the linkage chassis 110 on a side thereof opposite the handlebars 152, it may be appreciated that at least a portion of or all of the fork steerer 332, handlebar steerer 334, and flexible linkage member 336 may be disposed internally within the linkage chassis 110.

In this regard, the steering linkage assembly 330 may provide some noted benefit including a potential larger angular range of motion and potentially comprising a smaller volume profile to allow for smaller packaging (e.g., including internalizing the assembly to the linkage chassis 110 as described above).

With further reference to FIG. 12, an example of a steering linkage assembly 430 in which a steering spindle 448 is disposed in a headtube 402 of a bicycle frame 400. In turn, a fork tube 414 may be disposed in a steering tube 446 of the steering linkage assembly 430. In this regard, the fork 408 may be rotatable about the steering axis 444 of the steering tube 446 and the steering spindle 448 may be rotatable about the headtube axis 442. That is, the steering spindle 448 and the fork tube 414 may be in an inverted position from those shown in FIGS. 3-11. A fork steerer 432 may still be connected to a handlebar steerer 434 through a linkage member 446 as described above to facilitate corotation of the steering spindle 448 and the fork 408. When in the position shown in FIG. 12, the wheelbase of the bicycle frame 400 may be lengthened relative to the reach of the rider as the handlebars 452 may be in a closer position to the rider by virtue of the offset between the steering axis 444 and the headtube axis 442. Moreover, the fork 408 and the steering spindle 448 may be interchangeably positionable between the position shown in FIG. 12 and those shown in FIGS. 3-11 to allow for selectable configuration of the bicycle frame 400 by a user.

One general aspect of the present disclosure includes a steering linkage assembly for a bicycle. The steering linkage assembly includes a linkage chassis. The steering linkage assembly includes a steering tube that defines a steering tube axis. The steering tube axis is offset from a headtube axis of a headtube of the bicycle. The assembly also includes a fork steerer configured for co-rotation with a fork of the bicycle. The fork steerer is engaged with a fork tube that is positionable into one of the steering tube or the headtube. The assembly also includes a handlebar steerer configured for co-rotation with handlebars. The handlebar steerer is engaged with a steering spindle that is positionable into the other of the steering tube or the headtube. The assembly also includes one or more linkage members extending between the fork steerer and the handlebar steerer to impart co-rotational movement between the handlebar steerer and the fork steerer. The plurality of linkage members are disposed on a side of the linkage chassis opposite that on which the handlebars are attached to the handlebar steerer for uninterrupted movement of the linkage members by the headtube of the bicycle or the linkage chassis.

Implementations may include one or more of the following features. For example, the steering linkage assembly may include a headtube reference surface of the headtube on a side of the headtube opposite the fork. In addition, a steering tube reference surface may be on a side of the steering tube adjacent to an attachment location of the handlebars. The steering tube reference surface may be offset from the headtube reference surface in a direction toward the fork of the bicycle.

In an example, the linkage members may include linkage bars. The fork steerer and the handlebar steerer may rotate through a steering angle range limited only by contacting engagement of the linkage bars with each other.

In an example, the fork steerer may be integrated into the fork of the bicycle.

In an example, the linkage members may include segments of a continuous flexible linkage member extending about the fork steerer and the handlebar steerer.

The linkage chassis may be integrated into a frame of the bicycle. Alternatively, the linkage chassis may be separate from a frame of the bicycle and configured for attachment to the headtube of the bicycle. In this regard, a kit may be provided that includes a plurality of linkage chasses, each having a different offset length between the steering tube axis and the headtube axis. The kit may also include a plurality of linkage bar sets, each having different lengths corresponding to a given one of the plurality of linkage chasses. In turn, respective ones of the plurality of linkage chasses and linkage bar sets may be attachable to the fork steerer and the handlebar steerer, respectively, to define the different offset lengths between the steering tube axis and the headtube axis.

In an example, the steering spindle may be disposed in the steering tube and the fork tube is disposed in the headtube. Alternatively, the fork tube is disposed in the steering tube and the steering spindle is disposed in the headtube.

Another general aspect includes a bicycle. The bicycle includes a bicycle frame that has a headtube having a headtube axis. The bicycle also includes a linkage chassis that includes a steering tube that defines a steering tube axis. The steering tube axis is offset from the headtube axis of the headtube of the bicycle. The bicycle also includes a fork steerer configured for co-rotation with a fork of the bicycle. The fork steerer is engaged with a fork tube that is positionable into one of the steering tube or the headtube. The bicycle also includes a handlebar steerer configured for co-rotation with handlebars. The handlebar steerer is engaged with a steering spindle that is positionable into the other of the steering tube or the headtube. The bicycle also includes linkage members extending between the fork steerer and the handlebar steerer to impart co-rotational movement between the handlebar steerer and the fork steerer. The linkage members may be disposed on a side of the linkage chassis opposite that on which the handlebars are attached to the handlebar steerer for uninterrupted movement of the linkage members by the headtube of the bicycle or the linkage chassis.

Implementations may include one or more of the following features. For example, the bicycle may include a bottom bracket that defines a reach measurement and a stack measurement in relation to the headtube. The reach measurement may include a horizontal distance measured between the headtube and a vertical datum aligned with the bottom bracket. The stack measurement may include a vertical distance measured between the bottom bracket and a horizontal datum aligned with the headtube. The offset between the steering tube axis and the headtube axis may be defined independent of the reach measurement and the stack measurement.

In an example, the bicycle may include a headtube reference surface of the headtube on a side of the headtube opposite the fork. Also, a steering tube reference surface may be defined on a side of the steering tube adjacent to an attachment location of the handlebars. The steering tube reference surface may be offset from the headtube reference surface in a direction toward the fork of the bicycle.

In an example, the linkage members may include linkage bars. The fork steerer and the handlebar steerer may rotate through a steering angle range limited only by contacting engagement of the linkage bars with each other. Alternatively, the linkage member may include segments of a continuous flexible linkage member extending about the fork steerer and the handlebar steerer.

In an example, the linkage chassis may be integrated into a frame of the bicycle. Alternatively, the linkage chassis is separate from a frame of the bicycle and configured for attachment to the headtube of the bicycle frame. In this regard, a kit may be provided that includes a plurality of linkage chasses, each having a different offset length between the steering tube axis and the headtube axis. The kit may also include a plurality of linkage bar sets, each having different lengths corresponding to a given one of the plurality of linkage chasses. In turn, respective ones of the plurality of linkage chasses and linkage bar sets may be attachable to the fork steerer and the handlebar steerer, respectively, to define the different offset lengths between the steering tube axis and the headtube axis.

Furthermore, the following numbered examples are facilitated by the present disclosure:

1. A steering linkage assembly for a bicycle, comprising:
a linkage chassis comprising a steering tube that defines a steering tube axis, wherein the steering tube axis is offset from a headtube axis of a headtube of the bicycle;
a fork steerer configured for co-rotation with a fork of the bicycle, wherein the fork steerer is engaged with a fork tube that is positionable into one of the steering tube or the headtube;
a handlebar steerer configured for co-rotation with handlebars, wherein the handlebar steerer is engaged with a steering spindle that is positionable into the other of the steering tube or the headtube; and
one or more linkage member extending between the fork steerer and the handlebar steerer to impart co-rotational movement between the handlebar steerer and the fork steerer, the linkage member being disposed on a side of the linkage chassis opposite that on which the handlebars are attached to the steering spindle for uninterrupted movement of the linkage members by the headtube of the bicycle or the linkage chassis.

2. The steering linkage assembly of example 1, further comprising:
a headtube reference surface of the headtube on a side of the headtube opposite the fork; and
a steering tube reference surface on a side of the steering tube adjacent to an attachment location of the handlebars, the steering tube reference surface being offset from the headtube reference surface in a direction toward the fork of the bicycle.

3. The steering linkage assembly of any one of examples 1 or 2, wherein the linkage member comprises a plurality of linkage bars.

4. The steering linkage assembly of any one of examples 1-3, wherein the fork steerer and the handlebar steerer rotate through a steering angle range limited only by contacting engagement of the linkage bars with each other.

5. The steering linkage assembly of any one of examples 1-4, wherein the fork steerer is integrated into the fork of the bicycle.

6. The steering linkage assembly of any one of examples 1-5, wherein the linkage member comprises segments of a continuous flexible linkage member extending about the fork steerer and the handlebar steerer.

7. The steering linkage assembly of any one of examples 1-6, wherein the linkage chassis is integrated into a frame of the bicycle.

8. The steering linkage assembly of any one of examples 1-7, wherein the linkage chassis is separate from a frame of the bicycle and configured for attachment to the headtube of the bicycle.

9. The steering linkage assembly of any one of examples 1-8, further comprising:
a kit including:
a plurality of linkage chasses, each having a different offset length between the steering tube axis and the headtube axis;
a plurality of linkage bar sets, each having different lengths corresponding to a given one of the plurality of linkage chasses; and
wherein respective ones of the plurality of linkage chasses and linkage bar sets are attachable to the fork steerer and the handlebar steerer, respectively, to define the different offset lengths between the steering tube axis and the headtube axis.

10. The steering linkage assembly of any one of examples 1-9, wherein the steering spindle is disposed in the steering tube and the fork tube is disposed in the headtube.

11. The steering linkage assembly of any one of examples 1-10, wherein the fork tube is disposed in the steering tube and the steering spindle is disposed in the headtube.

12. The steering linkage assembly of any one of examples 1-11, wherein the fork steerer and the handlebar steerer are of different size such that a given amount of rotation of the fork steerer and the handlebar steerer is different.

13. The steering linkage assembly of any one of examples 1-12, wherein the given amount of rotation of the fork steerer is greater than the handlebar steerer.

14. The steering linkage assembly of any one of examples 1-12, wherein the given amount of rotation of the fork steerer is greater than the handlebar steerer.

15. A bicycle, comprising:
a bicycle frame including at least a headtube having a headtube axis;
a linkage chassis comprising a steering tube that defines a steering tube axis, wherein the steering tube axis is offset from the headtube axis of the headtube of the bicycle;
a fork steerer configured for co-rotation with a fork of the bicycle, wherein the fork steerer is engaged with a fork tube that is positionable into one of the steering tube or the headtube;
a handlebar steerer configured for co-rotation with handlebars, wherein the handlebar steerer is engaged with a steering spindle that is positionable into the other of the steering tube or the headtube; and
one or more linkage member extending between the fork steerer and the handlebar steerer to impart co-rotational movement between the handlebar steerer and the fork steerer, the linkage member being disposed on a side of the linkage chassis opposite that on which the handlebars are attached to the handlebar steerer for uninterrupted movement of the linkage member by the headtube of the bicycle or the linkage chassis.

16. The bicycle of example 15, further comprising:
a bottom bracket that defines a reach measurement comprising a horizontal distance measured between the headtube and a vertical datum aligned with the bottom bracket and a stack measurement comprising a vertical distance measured between the bottom bracket and a horizontal datum aligned with the headtube; and wherein the offset between the steering tube axis and the headtube axis is defined independent of the reach measurement and the stack measurement.

17. The bicycle of either one of examples 15 or 16, further comprising:
a headtube reference surface of the headtube on a side of the headtube opposite the fork; and
a steering tube reference surface on a side of the steering tube adjacent to an attachment location of the handlebars, the steering tube reference surface being offset from the headtube reference surface in a direction toward the fork of the bicycle.

18. The bicycle of any one of examples 15-17, wherein the linkage member comprises a plurality of linkage bars, and wherein the fork steerer and the handlebar steerer rotate through a steering angle range limited only by contacting engagement of the linkage bars with each other.

19. The bicycle of any one of examples 15-18, wherein the linkage member comprises segments of a continuous flexible linkage member extending about the fork steerer and the handlebar steerer.

20. The bicycle of any one of examples 15-19, wherein the linkage chassis is integrated into a frame of the bicycle.

21. The bicycle of any one of examples 15-20, wherein the linkage chassis is separate from a frame of the bicycle and configured for attachment to the headtube of the bicycle frame.

22. The bicycle of any one of examples 15-21, wherein the steering spindle is disposed in the steering tube and the fork tube is disposed in the headtube.

23. The bicycle of any one of examples 15-22, wherein the fork tube is disposed in the steering tube and the steering spindle is disposed in the headtube.

24. The bicycle of any one of examples 15-23, wherein the fork steerer and the handle bar steerer are of different size such that an given amount of rotation of the fork steerer and the handlebar steerer is different.

25. The bicycle of any one of examples 15-24, wherein the given amount of rotation of the fork steerer is greater than the handlebar steerer.

26. The bicycle of any one of examples 15-24, wherein the given amount of rotation of the fork steerer is greater than the handlebar steerer.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A steering linkage assembly for a bicycle, comprising:
a linkage chassis comprising a steering tube that defines a steering tube axis, wherein the steering tube axis is offset from a headtube axis of a headtube of the bicycle, wherein the linkage chassis is separate from a frame of the bicycle and configured for attachment to the headtube of the bicycle;
a fork steerer configured for co-rotation with a fork of the bicycle, wherein the fork steerer is engaged with a fork tube that is positionable into one of the steering tube or the headtube;
a handlebar steerer configured for co-rotation with handlebars, wherein the handlebar steerer is engaged with a steering spindle that is positionable into the other of the steering tube or the headtube;
one or more linkage member extending between the fork steerer and the handlebar steerer to impart co-rotational movement between the handlebar steerer and the fork steerer, the linkage member being disposed on a side of the linkage chassis opposite that on which the handlebars are attached to the steering spindle for uninterrupted movement of the linkage members by the headtube of the bicycle or the linkage chassis;
a headtube reference surface of the headtube on a side of the headtube opposite the fork; and
a steering tube reference surface on a side of the steering tube adjacent to an attachment location of the handlebars, the steering tube reference surface being offset from the headtube reference surface in a direction toward the fork of the bicycle.

2. The steering linkage assembly of claim 1, wherein the linkage member comprises a plurality of linkage bars.

3. The steering linkage assembly of claim 2, wherein the fork steerer and the handlebar steerer rotate through a steering angle range limited only by contacting engagement of the linkage bars with each other.

4. The steering linkage assembly of claim 1, wherein the fork steerer is integrated into the fork of the bicycle.

5. The steering linkage assembly of claim 1, wherein the linkage member comprises segments of a continuous flexible linkage member extending about the fork steerer and the handlebar steerer.

6. The steering linkage assembly of claim 1, further comprising:
a kit including:
a plurality of linkage chasses, each having a different offset length between the steering tube axis and the headtube axis;
a plurality of linkage bar sets, each having different lengths corresponding to a given one of the plurality of linkage chasses; and
wherein respective ones of the plurality of linkage chasses and linkage bar sets are attachable to the fork steerer and the handlebar steerer, respectively, to define the different offset lengths between the steering tube axis and the headtube axis.

7. The steering linkage assembly of claim 1, wherein the steering spindle is disposed in the steering tube and the fork tube is disposed in the headtube.

8. The steering linkage assembly of claim 1, wherein the fork tube is disposed in the steering tube and the steering spindle is disposed in the headtube.

9. The steering linkage assembly of claim 1, wherein the fork steerer and the handlebar steerer are of different size such that a given amount of rotation of the fork steerer and the handlebar steerer is different.

10. The steering linkage assembly of claim 9, wherein the given amount of rotation of the fork steerer is greater than the handlebar steerer.

11. The steering linkage assembly of claim 9, wherein the given amount of rotation of the fork steerer is less than the handlebar steerer.

12. A bicycle, comprising:
a bicycle frame including at least a headtube having a headtube axis;
a linkage chassis comprising a steering tube that defines a steering tube axis, wherein the steering tube axis is offset from the headtube axis of the headtube of the bicycle;
a fork steerer configured for co-rotation with a fork of the bicycle, wherein the fork steerer is engaged with a fork tube that is positionable into one of the steering tube or the headtube;
a handlebar steerer configured for co-rotation with handlebars, wherein the handlebar steerer is engaged with a steering spindle that is positionable into the other of the steering tube or the headtube; and
one or more linkage member extending between the fork steerer and the handlebar steerer to impart co-rotational movement between the handlebar steerer and the fork steerer, the linkage member being disposed on a side of the linkage chassis opposite that on which the handlebars are attached to the handlebar steerer for uninterrupted movement of the linkage member by the headtube of the bicycle or the linkage chassis, wherein the linkage member comprises a plurality of linkage bars, and wherein the fork steerer and the handlebar steerer rotate through a steering angle range limited only by contacting engagement of the linkage bars with each other.

13. The bicycle of claim 12, further comprising:
a bottom bracket that defines a reach measurement comprising a horizontal distance measured between the headtube and a vertical datum aligned with the bottom bracket and a stack measurement comprising a vertical distance measured between the bottom bracket and a horizontal datum aligned with the headtube; and
wherein the offset between the steering tube axis and the headtube axis is defined independent of the reach measurement and the stack measurement.

14. The bicycle of claim 12, further comprising:
a headtube reference surface of the headtube on a side of the headtube opposite the fork; and
a steering tube reference surface on a side of the steering tube adjacent to an attachment location of the handlebars, the steering tube reference surface being offset from the headtube reference surface in a direction toward the fork of the bicycle.

15. The bicycle of claim 12, wherein the linkage chassis is integrated into a frame of the bicycle.

16. The bicycle of claim 12, wherein the linkage chassis is separate from a frame of the bicycle and configured for attachment to the headtube of the bicycle frame.

17. The bicycle of claim 12, wherein the steering spindle is disposed in the steering tube and the fork tube is disposed in the headtube.

18. The bicycle of claim 12, wherein the fork tube is disposed in the steering tube and the steering spindle is disposed in the headtube.

19. The bicycle of claim 12, wherein the fork steerer and the handlebar steerer are of different size such that an given amount of rotation of the fork steerer and the handlebar steerer is different.

20. The bicycle of claim 19, wherein the given amount of rotation of the fork steerer is greater than the handlebar steerer.

21. The bicycle of claim 19, wherein the given amount of rotation of the fork steerer is less than the handlebar steerer.

* * * * *